United States Patent
Ono (10) Patent No.: US 8,238,652 B2
(45) Date of Patent: Aug. 7, 2012

(54) IMAGE PROCESSING APPARATUS AND METHOD, AND PROGRAM

(75) Inventor: Hiroaki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 933 days.

(21) Appl. No.: 12/272,028

(22) Filed: Nov. 17, 2008

(65) Prior Publication Data

US 2009/0141974 A1   Jun. 4, 2009

(30) Foreign Application Priority Data

Nov. 29, 2007   (JP) ................................ P2007-308265

(51) Int. Cl.
*G06K 9/34* (2006.01)

(52) U.S. Cl. ......... 382/165; 382/162; 382/164; 382/224

(58) Field of Classification Search .................. 382/100, 382/103, 104, 151, 154, 165, 209, 224, 164, 382/162; 430/271.1, 273.1; 180/167, 169; 701/28; 250/221, 208.1; 340/5.61, 5.64
See application file for complete search history.

(56) References Cited

U.S. PATENT DOCUMENTS 7,663,502 B2 * 2/2010 Breed ..................... 340/12.25

FOREIGN PATENT DOCUMENTS

| JP | 07-123252 | 5/1995 |
|---|---|---|
| JP | 2001-258820 | 9/2001 |
| JP | 2003-30646 | 1/2003 |
| JP | 2003-270137 | 9/2003 |
| JP | 2004-192129 | 7/2004 |

OTHER PUBLICATIONS

Office Action dated Nov. 22, 2011, issued by the Japanese Patent Office for corresponding Japanese Application No. 2007-308265.

* cited by examiner

*Primary Examiner* — Anh Hong Do
(74) *Attorney, Agent, or Firm* — Finnegan Henderson Farabow Garrett & Dunner LLP (57) ABSTRACT

An image processing apparatus includes a feature extracting unit configured to extract a feature in each local area from an image including a plurality of colors in bands of visible radiation and non-visible radiation, the feature having elements representing ratios between a reference color and individual colors; and a discriminating unit configured to discriminate an object in each local area by using the feature extracted for the local area by the feature extracting unit.

10 Claims, 11 Drawing Sheets

IMAGE PROCESSING APPARATUS AND METHOD, AND PROGRAM

CROSS REFERENCES TO RELATED APPLICATIONS

The present invention contains subject matter related to Japanese Patent Application JP 2007-308265 filed in the Japanese Patent Office on Nov. 29, 2007, the entire contents of which are incorporated herein by reference.

BACKGROUND OF THE INVENTION

1. Field of the Invention

The present invention relates to image processing apparatuses and methods, and programs. More specifically, the present invention relates to the present invention relates to an image processing apparatus and method and a program with which it is possible to discriminate an object in each local area in an image.

2. Description of the Related Art

Recently, digital cameras, camcorders, security cameras, and so forth equipped with object recognition functions are available. Applications of object recognition range greatly, including control of exposure, white balance, and auto focus (AF) optimal for an object, face detection, and tracking of an object.

As a method of face recognition, a method of recognizing a face by using a spatial gradient of luminance or the like exists. In this method, a human face is recognized by using a spatial feature of the human face.

As a method of skin color recognition, a method exists in which color information represented in the RGB (red, green, and blue) color space is converted into color information represented in the HSV (hue, saturation, and brightness) color space for recognition of skin color. Since the hue H and the brightness V are independent in the HSV color system, it is possible to check hue without being affected by brightness of a picture. Thus, by specifying a certain range of hue H in the HSV color space, it is possible to specify skin color without being affected by brightness or the like.

Furthermore, there has been proposed a method in which an extended chromatic point of an object is calculated on the basis of information acquired by an imaging element having spectral sensitivity for four colors including luminance Ye in addition to the RGB three primary colors, and an object is discriminated by comparing a distance with an extended chromatic point of a known object. (See Japanese Unexamined Patent Application Publication No. 2003-030646.) As opposed to a chromatic point calculated on the basis of color signals of the RGB three primary colors, which is a two-dimensional value, the extended chromatic point based on the four colors of RGB and Ye is a three-dimensional value, so that the accuracy of object discrimination is improved.

SUMMARY OF THE INVENTION

However, in a case where an object is recognized on the basis of luminance and RGB three primary colors as described above, with objects having similar luminance and RGB values, even if a feature space is converted from the RGB color space to the HSV color space to change the type of feature for feature extraction, information acquired in the visible spectrum is limited, so that it is still difficult to discriminate an object in some cases.

Furthermore, with the existing recognition method based on a spatial feature, although it is possible to recognize an object if the object has a certain spatial feature, as in the case of a face, it is not necessarily possible to recognize an object if the object does not have any particular spatial feature, as in the case of the sky, tree leaf, or other objects with various shapes.

Furthermore, in a case where the accuracy of recognition is improved by extending a feature representation space by adding a visible color other than the RGB three primary colors, with objects having similar spectral characteristics in the visible spectrum, in some cases, it is difficult to discriminate the objects whatever colors in the visible spectrum are added.

It is desired that, particularly by performing pixel-by-pixel object recognition by using non-visible radiation as well as visible radiation, object discrimination can be performed with an improved accuracy compared with the related art based on only visible radiation, and discrimination of an object without any particular spatial feature is allowed by performing object discrimination on a pixel-by-pixel basis.

According to an embodiment of the present invention, there is provided an image processing apparatus including feature extracting means for extracting a feature in each local area from an image including a plurality of colors in bands of visible radiation and non-visible radiation, the feature having elements representing ratios between a reference color and individual colors; and discriminating means for discriminating an object in each local area by using the feature extracted for the local area by the feature extracting means.

The local area may be an area defined on a pixel-by-pixel basis.

The non-visible radiation may include ultraviolet radiation and infrared radiation.

The reference color may include a color in a band of visible radiation.

The image processing apparatus may further include image pickup means for picking up an image including the plurality of colors in the bands of visible radiation and non-visible radiation.

The feature extracting means may extract, as the feature, a feature vector having the elements representing the ratios between the reference color and the individual colors for each local area.

The feature extracting means, in addition to extracting for each local area the feature having the elements representing the ratios between the reference color and the individual colors, may extract a spatial feature for each local area, and the discriminating means, in addition to discriminating the object in each local area by using the feature having the elements representing the ratios between the reference color and the individual colors, extracted for the local area by the feature extracting means, may discriminate the object by using the spatial feature extracted for the local area by the feature extracting means.

According to another embodiment of the present invention, there is provided an image processing method including the steps of extracting a feature in each local area from an image including a plurality of colors in bands of visible radiation and non-visible radiation, the feature having elements representing ratios between a reference color and individual colors; and discriminating an object in each local area by using the feature extracted for the local area in the feature extracting step.

According to another embodiment of the present invention, there is provided a program for causing a computer to execute processing including the steps of extracting a feature in each local area from an image including a plurality of colors in bands of visible radiation and non-visible radiation, the feature having elements representing ratios between a reference color and individual colors; and discriminating an object in each local area by using the feature extracted for the local area in the feature extracting step.

According to another embodiment of the present invention, there is provided a program storage medium storing the program described above.

According to the image processing apparatus, method, and program of these embodiments of the present invention, a feature in each local area is extracted from an image including a plurality of colors in bands of visible radiation and non-visible radiation, the feature having elements representing ratios between a reference color and individual colors, and an object is discriminated in each local area by using the feature extracted for the local area.

The image processing apparatus may be an independent apparatus or a block that executes image processing.

According to these embodiments of the present invention, particularly, it becomes possible to discriminate an object without any particular spatial feature by enabling pixel-by-pixel discrimination of an object with high accuracy.

DESCRIPTION OF THE PREFERRED EMBODIMENTS

Figure 1:
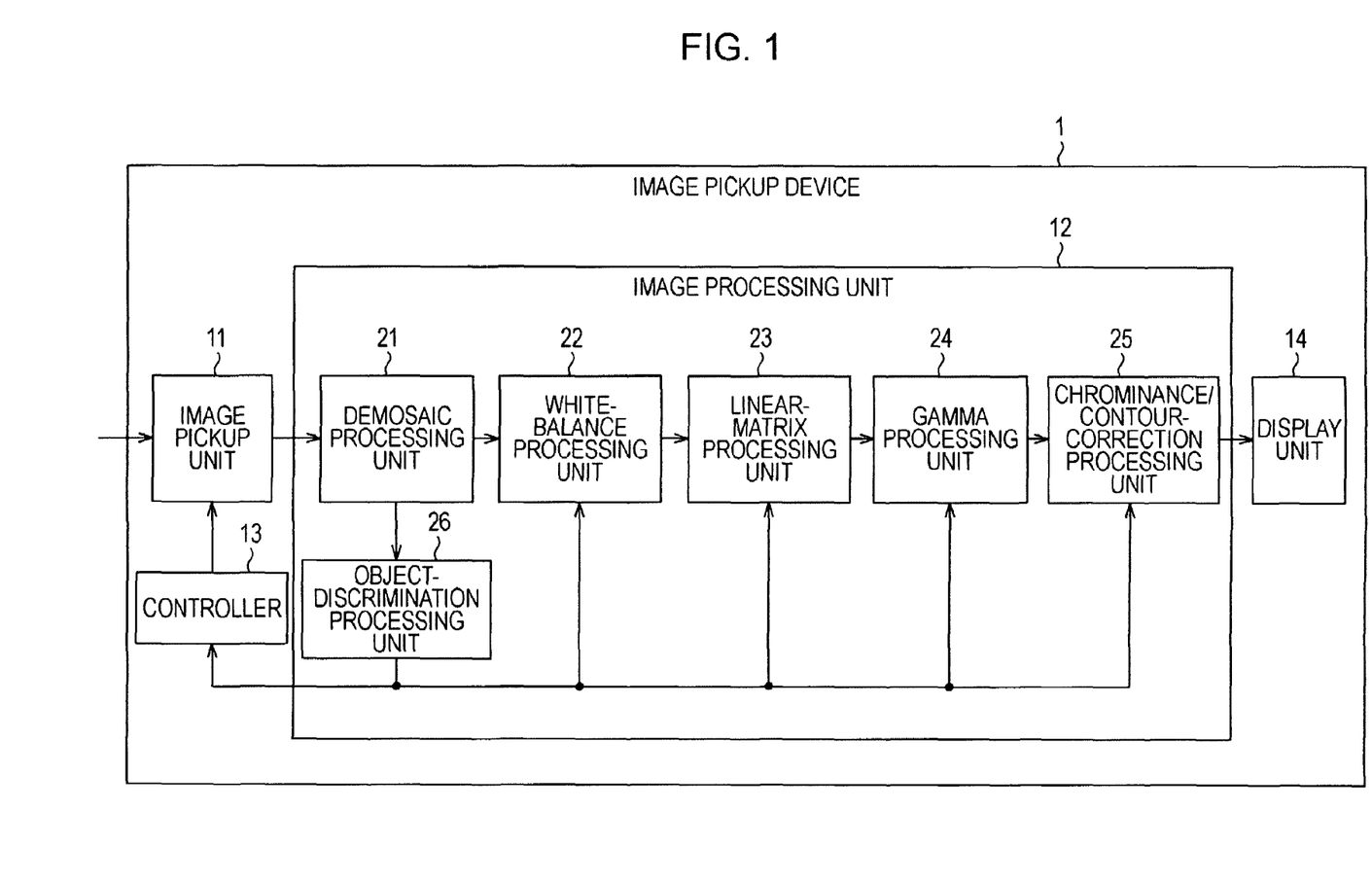
FIG. 1 is a block diagram showing an example configuration of an image pickup device according to an embodiment of the present invention.

FIG. 1 shows an image pickup device according to an embodiment of the present invention.

Referring to FIG. 1, in an image pickup device 1, an image pickup unit 11 picks up an image, an image processing unit 12 discriminates an object on a pixel-by-pixel basis in the image that has been picked up and performs white balancing, color reproduction, gamma correction, and chrominance/contour correction, and an image display unit 14 displays a resulting image. The image pickup unit 11 is constructed of an imaging element capable of picking up radiation including visible radiation and non-visible radiation by a charge coupled device (CCD) or a complementary metal oxide semiconductor (CMOS) device, an optical block, and so forth. The exposure, focus, and so forth of the image pickup unit 11 are adjusted by a controller 13 so that the optical block and the imaging element operate optimally for an object whose image is being picked up. The image pickup unit 11 in the state adjusted by the controller 13 picks up an image and supplies the image to the image processing unit 12.

The image processing unit 12 executes processing on the image supplied from the image pickup unit 11, and displays a resulting image on the display unit 14. A demosaic processing unit 21 of the image processing unit 12 performs demosaic processing by obtaining components of all the colors that have been picked up for each pixel in the image data supplied from the image pickup unit 11, and supplies the result to an object-discrimination processing unit 26. Furthermore, the demosaic processing unit 21 supplies data of the RGB three primary colors in the result of the demosaic processing to a white-balance processing unit 22.

On the basis of the result of pixel-by-pixel object discrimination, supplied from the object-discrimination processing unit 26, the white-balance processing unit 22 adjusts white balance so that the RGB data supplied from the demosaic processing unit 21 represents white correctly as white even with light sources having different color temperatures, and supplies the adjusted RGB data to a linear-matrix processing unit 23.

On the basis of the result of pixel-by-pixel object discrimination, supplied from the object-discrimination processing unit 26, the linear-matrix processing unit 23 converts the input RGB data by using, for example, a 3×3 conversion matrix, and supplies RGB data obtained through the linear matrix conversion to a gamma processing unit 24.

On the basis of the result of pixel-by-pixel object discrimination, supplied from the object-discrimination processing unit 26, the gamma processing unit 24 converts input/output characteristics so that the RGB data obtained through the linear matrix processing exhibits desired gamma characteristics, and supplies RGB data obtained through the conversion to a chrominance/contour-correction processing unit 25.

On the basis of the result of pixel-by-pixel object discrimination, supplied from the object-discrimination processing unit 26, the chrominance/contour-correction processing unit 25 performs luminance and chrominance conversion on the RGB data obtained through the gamma processing, performs correction such as emphasis for chrominance and performs contour correction such as high-frequency emphasis for luminance, and outputs the result of correction to the display unit 14, such as a liquid crystal display, so that a corresponding image is displayed thereon.

The flow of data processing from the image pickup unit 11 to the chrominance/contour-correction processing unit 25 is similar to processing performed in ordinary cameras, but is different from the processing performed in ordinary cameras in that the image pickup unit 11 and the demosaic processing unit 21 deal with non-visible radiation. Furthermore, the object-discrimination processing unit 26 discriminates an object by using data generated by the demosaic processing unit 21, the data being composed of a plurality of colors including visible and non-visible radiation on a pixel-by-pixel, and supplies the result of discrimination to the white-balance processing unit 22, the linear-matrix processing unit 23, the gamma processing unit 24, the chrominance/contour-correction processing unit 25, and the controller 13. The controller 13 controls the imaging element and the optical block of the image pickup unit 11. More specifically, the controller 13 controls exposure and focus. Furthermore, on the basis of the result of pixel-by-pixel object discrimination, supplied from the object-discrimination processing unit 26, the controller 13 controls exposure and focus optimally for an object.

More specifically, for example, the controller 13 controls focus so that when a person is detected as an object, the person comes in focus, and controls exposure so that overexposure of an object will not occur. Furthermore, the result of object discrimination, output from the object-discrimination processing unit 26, is used in the white-balance processing unit 22 and the linear-matrix processing unit 23 to execute processing for achieving color reproduction optimal for a discriminated object, for example, processing for reproducing an appropriate human skin color upon detection of human skin, is used for optimal gamma correction in the gamma processing unit 24 so that underexposure or overexposure of a detected object will not occur, and is used for chrominance correction and contour correction optimal for a detected object in the chrominance/contour-correction processing unit 25.

With the configuration described above and shown in FIG. 1, it is possible to obtain an ordinary RGB image, and also to perform signal processing optimal for an object by performing object discrimination using visible radiation and non-visible radiation.

Next, an example configuration of the object-discrimination processing unit 26 will be described with reference to FIG. 2.

A feature extracting unit 41 sequentially obtains data of each pixel, output from the demosaic processing unit 21 shown in FIG. 1, extracts a feature, and supplies the extracted feature to a discriminating unit 42. The discriminating unit 42 reads feature vectors representing features, classified in accordance with object types and stored in a feature-vector storage unit 4, compares the feature extracted by the feature extracting unit 41 with the feature vectors by using, for example, the distance in a feature vector space as a degree of similarity, and determines a feature vector with a highest degree of similarity as corresponding to an object represented by the pixel. Then, the feature extracting unit 41 stores the result of discrimination in a discrimination-result storage unit 43 on a pixel-by-pixel basis. The discrimination-result storage unit 43 stores results of object discrimination for all the pixels. Upon completion of the object discrimination process for all the pixels, the discrimination-result storage unit 43 supplies the results of pixel-by-pixel object discrimination stored therein to the white-balance processing unit 22, the linear-matrix processing unit 23, the gamma processing unit 24, the chrominance/contour-correction processing unit 25, and the controller 13.

Figure 3:
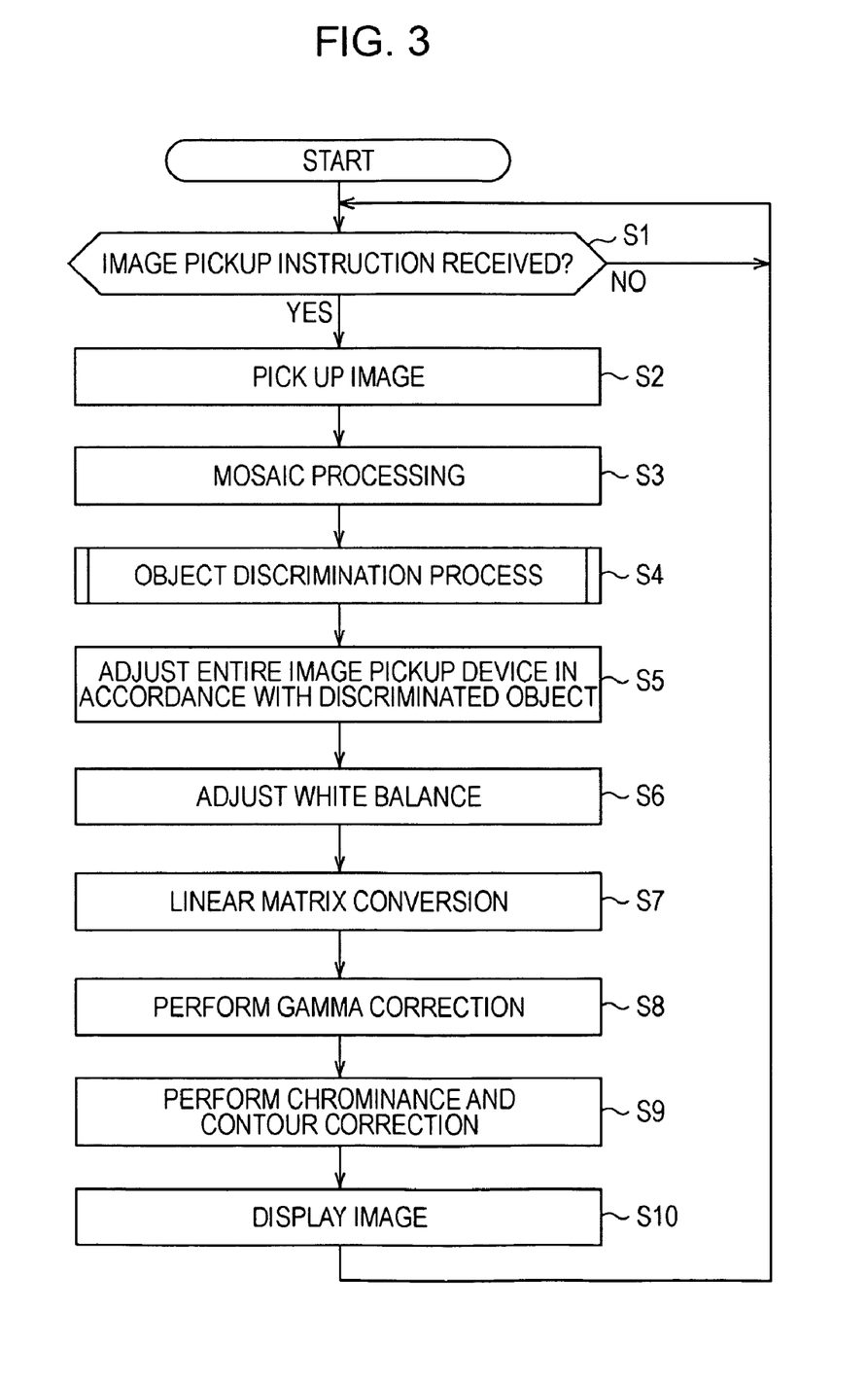
FIG. 3 is a flowchart of an image pickup process.

Next, an image pickup process will be described with reference to a flowchart shown in FIG. 3.

In step S1, under the control of the controller 13, the image pickup unit 11 determines whether an image pickup instruction has been received in response to a user's operation of an operation unit (not shown) or the like. The image pickup unit 11 repeats this operation until it is determined that an image pickup instruction has been received. For example, if it is determined in step S1 that an image pickup instruction has been received, in step S2, on the basis of a result of discrimination by the object-discrimination processing unit 26, which will be described later, the controller 13 controls the optical block and the imaging element of the image pickup unit 11 to achieve appropriate image pickup conditions with appropriate exposure and focus. Then, the image pickup unit 11 in the appropriate image pickup conditions under the control of the controller 13 picks up an image based on radiation in a band including visible radiation and non-visible radiation, and supplies data of the image that has been picked up to the image processing unit 12 on a pixel-by-pixel basis. The pixel-by-pixel data includes, in addition to information of the three primary colors RGB, information of pixel values involving ultraviolet radiation (UV) and infrared radiation (IR). In an initial iteration of the process, since no result of pixel-by-pixel object discrimination has been supplied yet from the object-discrimination processing unit 26 to the controller 13, the controller 13 adjusts exposure and focus of the image pickup unit 11 on the basis of preset values. Hereinafter, information regarding the three primary colors and ultraviolet and infrared radiation will be denoted simply as R, G, B, UV, and IR.

In step S3, the demosaic processing unit 21 performs demosaic processing by collecting components of all the colors on a pixel-by-pixel basis in the image data supplied from the image pickup unit 11, and supplies the result of processing to the object-discrimination processing unit 26. Furthermore, among the result of the demosaic processing, the demosaic processing unit 21 supplies data regarding the RGB three primary colors to the white-balance processing unit 22.

In step S4, the object-discrimination processing unit 26 executes an object discrimination process to discriminate an object on a pixel-by-pixel basis, and supplies the result of discrimination to the white-balance processing unit 22, the linear-matrix processing unit 23, the gamma processing unit 24, the chrominance/contour-correction processing unit 25, and the controller 13. The object discrimination process will be described later in detail.

In step S5, each of the white-balance processing unit 22, the linear-matrix processing unit 23, the gamma processing unit 24, the chrominance/contour-correction processing unit 25, and the controller 13 performs optimal setting on the basis of the result of pixel-by-pixel object discrimination, supplied from the object-discrimination processing unit 26.

In step S6, the white-balance processing unit 22 adjusts white balance so that the RGB data supplied from the demosaic processing unit 21 represents white correctly as white even with light sources having different color temperatures, and supplies the adjusted RGB data to the linear-matrix processing unit 23.

In step S7, the linear-matrix processing unit 23 converts the input RGB data by using a conversion matrix, and supplies the resulting RGB data to the gamma processing unit 24.

In step S8, the gamma processing unit 24 converts input/output characteristics so that the RGB data obtained through the linear matrix conversion exhibits desired gamma characteristics, and supplies RGB data obtained through the conversion to the chrominance/contour-correction processing unit 25.

In step S9, the chrominance/contour-correction processing unit 25 performs correction such as emphasis for chrominance and contour correction such as high-frequency emphasis for luminance on the RGB data obtained through the gamma processing, and outputs the result of correction to the display unit 14 so that a corresponding image is displayed.

Through the process described above, on the basis of the result of pixel-by-pixel object discrimination in an image that has been picked up, an image picked up under optimal conditions is displayed. Although an image that has been picked up is displayed on the display unit 14 in the example described above, obviously, without limitation to displaying, an image that has been picked up may be recorded on a recording medium (not shown), distributed via a network (not shown), and so forth.

Figure 4:
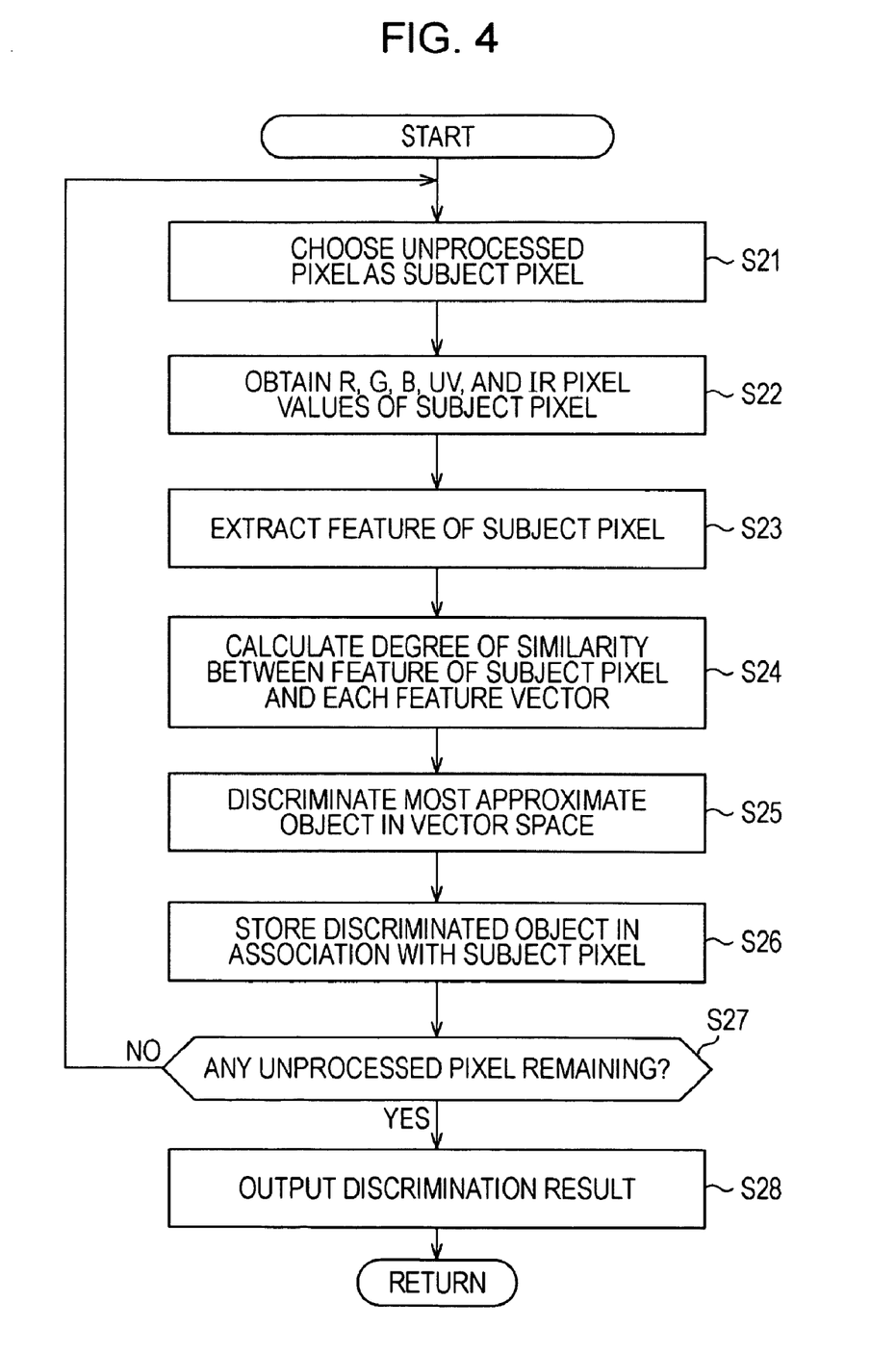
FIG. 4 is a flowchart of an object discrimination process executed by the object-discrimination processing unit shown in FIG. 2.

Next, the object discrimination process executed by the object-discrimination processing unit 26 shown in FIG. 2 will be described.

In step S21, the feature extracting unit 41 chooses an unprocessed pixel in an image supplied thereto as a subject pixel for the process.

In step S22, the feature extracting unit 41 obtains information regarding the three primary colors R, G, and B, ultraviolet radiation UV, and infrared radiation IR at the subject pixel.

In step S23, for example, the feature extracting unit 41 extracts a feature vector FV expressed by equation (1) below as a feature of the subject pixel, and supplies the feature vector FV to the discriminating unit 42.

$$FV = (v_1, v_2, v_3, v_4) = \left(\frac{IR}{G}, \frac{R}{G}, \frac{B}{G}, \frac{UV}{G}\right) \quad (1)$$

In equation (1), the feature vector FV is a vector composed of elements v1 to v4. The elements v1 to v4 are obtained by normalizing IR, R, B, and UV by G, respectively. By using the feature vector FV expressed in equation (1), information having five dimensions corresponding to R, G, B, IR, and UV can be reduced to four dimensions, so that the amount of information to deal with can be reduced. Furthermore, regarding color information, although pixel values usually change in proportion as exposure changes, color ratios do not change. Thus, by using the feature vector expressed in equation (1), a feature not affected by exposure can be formed.

In step S24, for example, the discriminating unit 42 calculates a distance in a vector space as a degree of similarity between the feature vector supplied from the feature extracting unit 41 and each of all the feature vectors stored in the feature-vector storage unit 44 individually in association with various objects.

Figure 5:
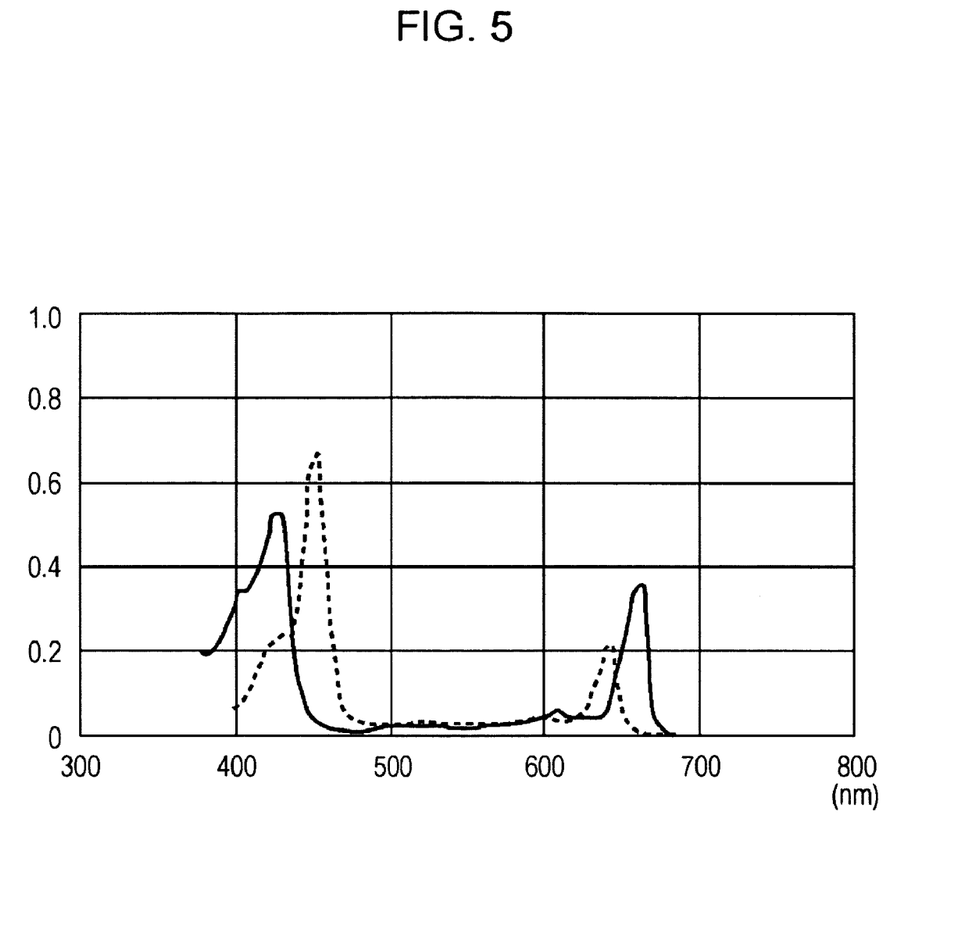
FIG. 5 is a graph for explaining the object discrimination process.

For example, in the case where the object is a tree leaf, since the tree leaf includes chlorophyll and performs photosynthesis, as shown in FIG. 5, the tree leaf absorbs visible radiation in a wavelength range of 450 nm to 680 nm. In FIG. 5, the horizontal axis represents wavelength, and the vertical axis represents the amount of radiation absorbed. Furthermore, in FIG. 5, a solid line and a dotted line indicate the amounts of radiation absorbed by two types of chlorophyll.

Figure 6:
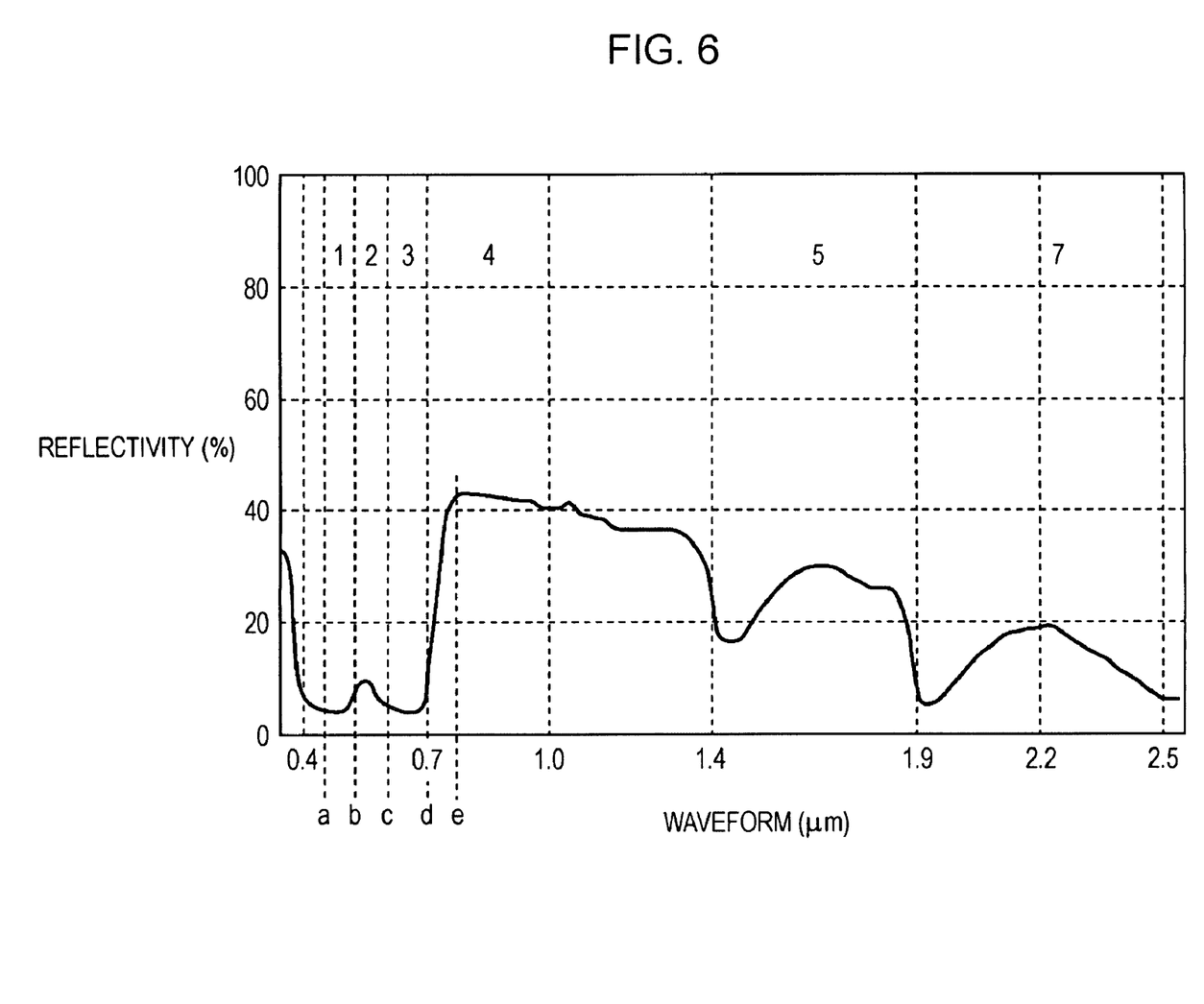
FIG. 6 is a graph for explaining the object discrimination process.

Furthermore, in order to protect chlorophyll, which is susceptible to the effect of heat, the tree leaf exhibits a high reflectivity for wavelengths in the vicinity of 750 nm to 1300 nm, corresponding to infrared radiation IR, which transmits heat, as shown in FIG. 6. In FIG. 6, the horizontal axis represents wavelength, and the vertical axis represents reflectivity. The range of sudden change in reflectivity between 680 nm to 750 nm is called the red edge, representing characteristic information obtained with visible radiation and non-visible radiation. In FIG. 6, the range of wavelengths a to b is a B band, the range of wavelengths b to c is a G band, and the range of wavelengths c to d is an R band, and the range of wavelengths d to e is a band where the red edge occurs.

As described above, the tree leaf reflects radiation in the G band in the visible spectrum and strongly reflects radiation in the band where the red edge occurs in the non-visible spectrum, so that a feature vector representing such characteristics is formed. Thus, when the object represented by a subject pixel is a tree leaf, the feature vector of the subject pixel has a distance close to a feature vector representing the characteristics described above. The tree leaf looks green to human eyes because the tree leaf reflects radiation in the G band more strongly than radiation in the R and B bands in the visible spectrum.

Similarly, for example, in the air, the Rayleigh scattering is caused by molecules in the air, and radiation is scattered more strongly as the wavelength of radiation becomes shorter. Thus, for example, in the case where the object is a blue sky, infrared radiation is not scattered, so that an image of the object has a dark infrared component. In contrast, for example, ice particles exist in cloud, which scatter infrared radiation, so that an image of the object has a bright infrared component. Therefore, in a feature vector, the IR component representing infrared radiation is small when the object is the blue sky and is large when the object is a cloud or the like.

Furthermore, for example, in the case where the object is a human skin, melanocyte (pigment cell) forming the skin absorbs ultraviolet light UV to cause sunburn. Thus, human skin tends to absorb ultraviolet light UV. Thus, in the case where the object is human skin, the ratio of ultraviolet light UV is small in the feature vector.

In the feature-vector storage unit 44, a plurality of feature vectors are registered in association with objects. The discriminating unit 42 calculates a distance between an extracted feature vector and feature vectors stored in the feature-vector storage unit 44. Then, for example, the discriminating unit 42 calculates an average of distances of the extracted feature vectors from a plurality of feature vectors registered in association with objects representing blue sky, as a degree of similarity between the extracted feature vector and feature vectors of blue sky. Furthermore, the discriminating unit 42 calculates an average of distances between the extracted feature vector and a plurality of feature vectors of objects representing tree leaves, as a degree of similarity between the extracted feature vector and feature vectors of tree leaves. Furthermore, the discriminating unit 42 calculates an average of distances between the extracted feature vector and a plurality of feature vectors registered in association with objects representing human skin, as a degree of similarly between the extracted feature vector and feature vectors of objects representing human skin. Although an average of distances with a plurality of feature vectors registered in association with the same object is used as a degree of similarity in the example described above, other types of value may be used as a degree of similarity as long as the value defines a degree of similarity between a subject pixel and a pixel of an object.

In step S25, the discriminating unit 42 discriminates an object having a highest degree of similarity with the extracted feature vector among feature vectors registered in association with certain objects as an objected represented by the subject pixel. For example, the discriminating unit 42 compares the degree of similarity between the extracted feature vector and feature vectors of blue sky, the degree of similarity between the extracted feature vector and feature vectors of tree leaf, and the degree of similarity between the extracted feature vector and feature vectors of human skin. Then, the discriminating unit 42 discriminates an object with a highest degree of similarity as an object represented by the subject pixel.

In step S26, the discriminating unit 42 stores information of the object according to the result of discrimination in the discrimination-result storage unit 43 in association with the subject pixel.

In step S27, the feature extracting unit 41 determines whether any unprocessed pixel remains. If it is determined that any unprocessed pixel remains, the process returns to step S21. That is, the process in steps S21 to S27 is repeated until it is determined in step S27 that no unprocessed pixel remains. When it is determined in step S27 that no unprocessed pixel remains, i.e., when object discrimination has been performed for all the pixels in the image supplied, in step S28, the discrimination-result storage unit 43 supplies information of objects for all the pixels, stored therein, to the white-balance processing unit 22, the linear-matrix processing unit 23, the gamma processing unit 24, the chrominance/contour-correction processing unit 25, and the controller 13 as discrimination results.

Through the process described above, it is possible to improve the accuracy of discrimination by using non-visible radiation as well as visible radiation in object discrimination.

For example, regarding R, G, and B in the visible spectrum, in the case of objects having similar pixel values for R, G, and B components, discrimination is difficult in whatever feature space. However, in the discrimination method described above, by using non-visible radiation, even in the case of objects having similar reflection characteristics in the visible spectrum, it is possible to discriminate the objects if the objects have different reflection characteristics in the non-visible spectrum. For example, in discrimination in the visible spectrum, when a hand is placed in front of a wall having a color similar to the color of the skin of the hand, it is difficult to discriminate the color of the skin of the hand from the color of the wall on the background. However, by using spectral characteristics of the human skin in the non-visible spectrum (absorbs ultraviolet light UV and emits infrared light IR), it becomes possible to discriminate the human skin from the wall on the background even if the human skin and the wall have the same color in the visible spectrum. In the above description, the non-visible radiation includes ultraviolet light and infrared light.

Furthermore, through the process described above, it becomes possible to discriminate objects on a pixel-by-pixel basis. That is, discrimination becomes possible for objects having various shapes, such as the sky, human skin, and tree leaf. Since it is possible to discriminate objects on a pixel-by-pixel basis, it is possible to calculate the position of an object in an image or an occupation ratio of the object in the image. This can be applied to scene analysis or the like.

Furthermore, it is possible to improve the accuracy of discrimination by using spatial discrimination in combination with the pixel-by-pixel object discrimination. For example, by using spatial features, it is possible to first recognize a face image on the basis of spatial arrangement of the eyes, nose, mouse, and so forth and then comparing a feature vector of a subject pixel with feature vectors of human skin. This serves to improve the accuracy of discrimination and to increase processing speed.

Furthermore, although image pickup involves the three primary colors of R, G, and B in the visible spectrum and the two colors of ultraviolet light UV and infrared light IR in the non-visible spectrum, the number of colors in the visible spectrum and the number of colors in the non-visible spectrum are not limited to the above number of colors. It is possible to improve the accuracy of discrimination by using a greater number of colors.

In the example described above, feature vectors associated individually with predetermined objects are stored, and the discriminating unit 42 discriminates an object represented by a subject pixel as an object having a high degree of similarity by comparing an extracted feature vector with the stored feature vectors. Alternatively, instead of the discriminating unit 42, a non-linear discriminator generated by machine learning based on sample images may be used. In this case, instead of the feature-vector storage unit 44, a storage unit that stores parameters used by the non-linear discriminator is provided. As a result, since the non-linear discriminates an object, it is possible to improve processing speed. Furthermore, since it suffices to store only parameters and it is not necessary to store feature vectors for individual objects, it is possible to reduce the storage capacity of a storage unit. As the discriminator, for example, a multilayer perceptron (MLP), a support vector machine (SVM), or Adaboost may be used.

The IR, R, G, B, and UV method earlier can be expressed by equations (2) below:

$$IR = \int_{\lambda=IR} L_\lambda \cdot O_\lambda \cdot C_\lambda \, d\lambda \qquad (2)$$

$$R = \int_{\lambda=R} L_\lambda \cdot O_\lambda \cdot C_\lambda \, d\lambda$$

$$G = \int_{\lambda=G} L_\lambda \cdot O_\lambda \cdot C_\lambda \, d\lambda$$

$$B = \int_{\lambda=B} L_\lambda \cdot O_\lambda \cdot C_\lambda \, d\lambda$$

$$UV = \int_{\lambda=UV} L_\lambda \cdot O_\lambda \cdot C_\lambda \, d\lambda$$

In equation (2), $L_\lambda$ denotes the spectral characteristics of a light source, $O_\lambda$ denotes the spectral reflection characteristics of an object, and $C_\lambda$ denotes the spectral characteristics of the image pickup unit 11.

That is, the integral values of the product of the spectral characteristics of the light source, the spectral reflection characteristics of the object, and the spectral characteristics of the camera are observed as components of individual colors.

The spectral reflection characteristics of an object to be discriminated and the spectral characteristics of the camera are fixed and do not vary among image pickup operations. On the other hand, the spectral characteristics of the light source vary depending on light sources. Thus, in order to determine whether observed value corresponds to an object to be discriminated, the spectral reflection characteristics of the object to be discriminated and the spectral characteristics of the camera should be examined in advance. By calculating theoretical values by using combination of these characteristics and spectral characteristics of various light sources, it becomes possible to discriminate an object by comparison with observed values.

Alternatively, it is possible to calculate theoretical values by estimating types and spectral characteristics of light sources by other means, and to perform discrimination by comparison of observed values.

Yet alternatively, it is possible to pick up images of an object to be discriminated by using various light sources and to generate feature vectors for discrimination by using observed values. By generating a discriminator by machine learning by using the observed values as learning data, it becomes possible to discriminate the object without using the spectral characteristics of the light source, the spectral reflection characteristics of the object, or the spectral characteristics of the camera.

Discriminators may be generated on a per-object basis. Furthermore, discriminators may be generated for various light sources per each object. Furthermore, in the case of discrimination by discriminators generated by machine learning, discrimination can be performed more quickly compared with the case of calculating theoretical values from the spectral characteristics of the light source, the spectral reflection characteristics of the light source, and the spectral characteristics of the camera.

In the example described above, for each of the feature vectors supplied from the feature extracting unit 41, the discriminating unit 42 calculates a degree of similarity with feature vectors registered in advance and stored in the feature-vector storage unit 44 for each object, and determines an object associated with a feature vector having a highest degree of similarity as an object represented by the subject pixel. In this case, however, since one discriminating unit calculates a degree of similarity with each and every one of all the feature vectors, if the number of feature vectors stored in advance is huge, processing could take a considerable time. Thus, a discriminator that calculates a degree of similarity may be provided for each object and an object having a highest degree of similarity may be selected.

Figure 7:
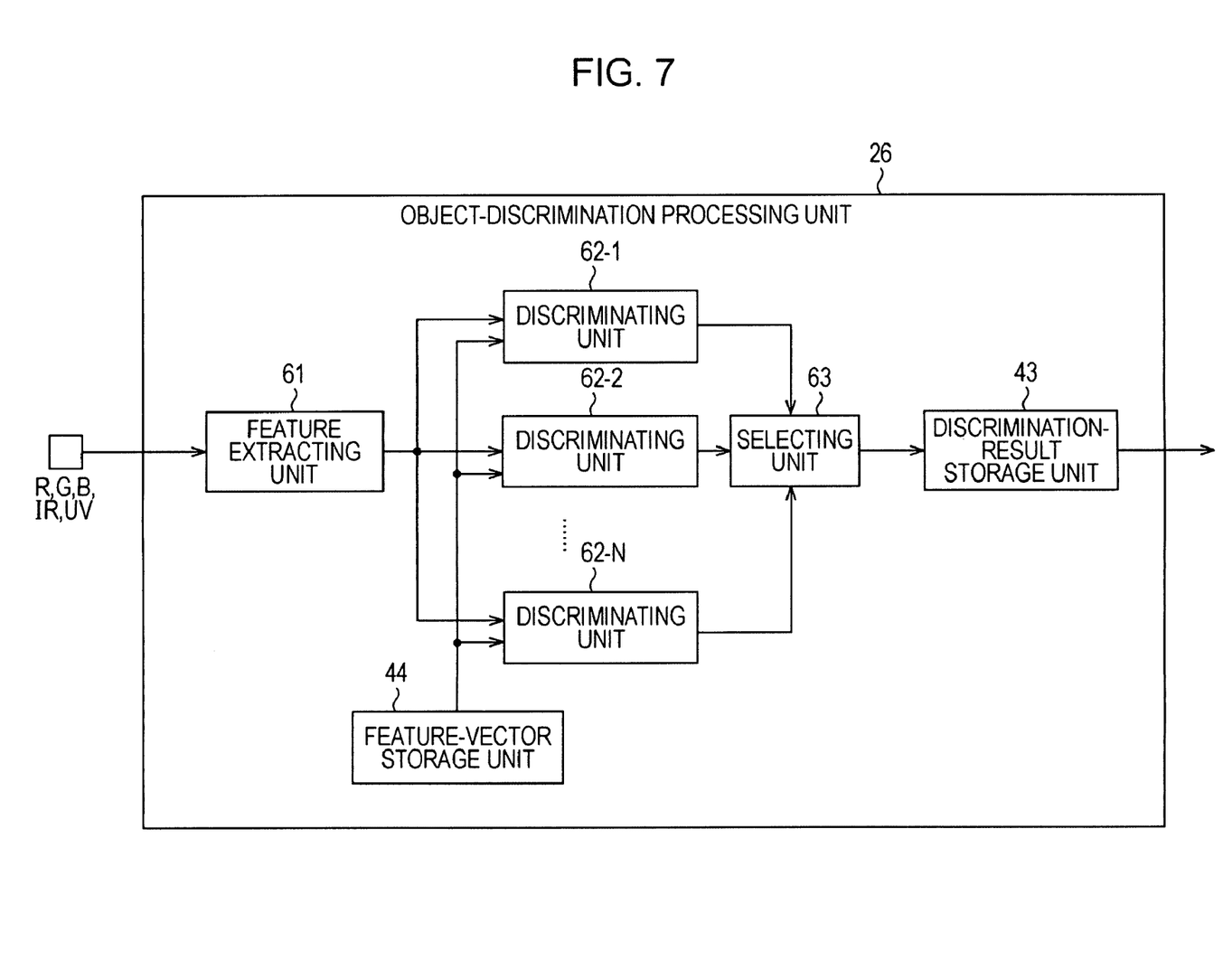
FIG. 7 is a diagram showing another example configuration of an object-discrimination processing unit.

FIG. 7 shows an example configuration the object-discrimination processing unit 26, in which discriminators that calculate degrees of similarity are provided for individual objects and an object having a highest degree of similarity is selected. Regarding the object-discrimination processing unit 26 shown in FIG. 7, parts corresponding to those shown in FIG. 2 are designated by the same numerals, and description thereof will be omitted when appropriate.

Figure 2:
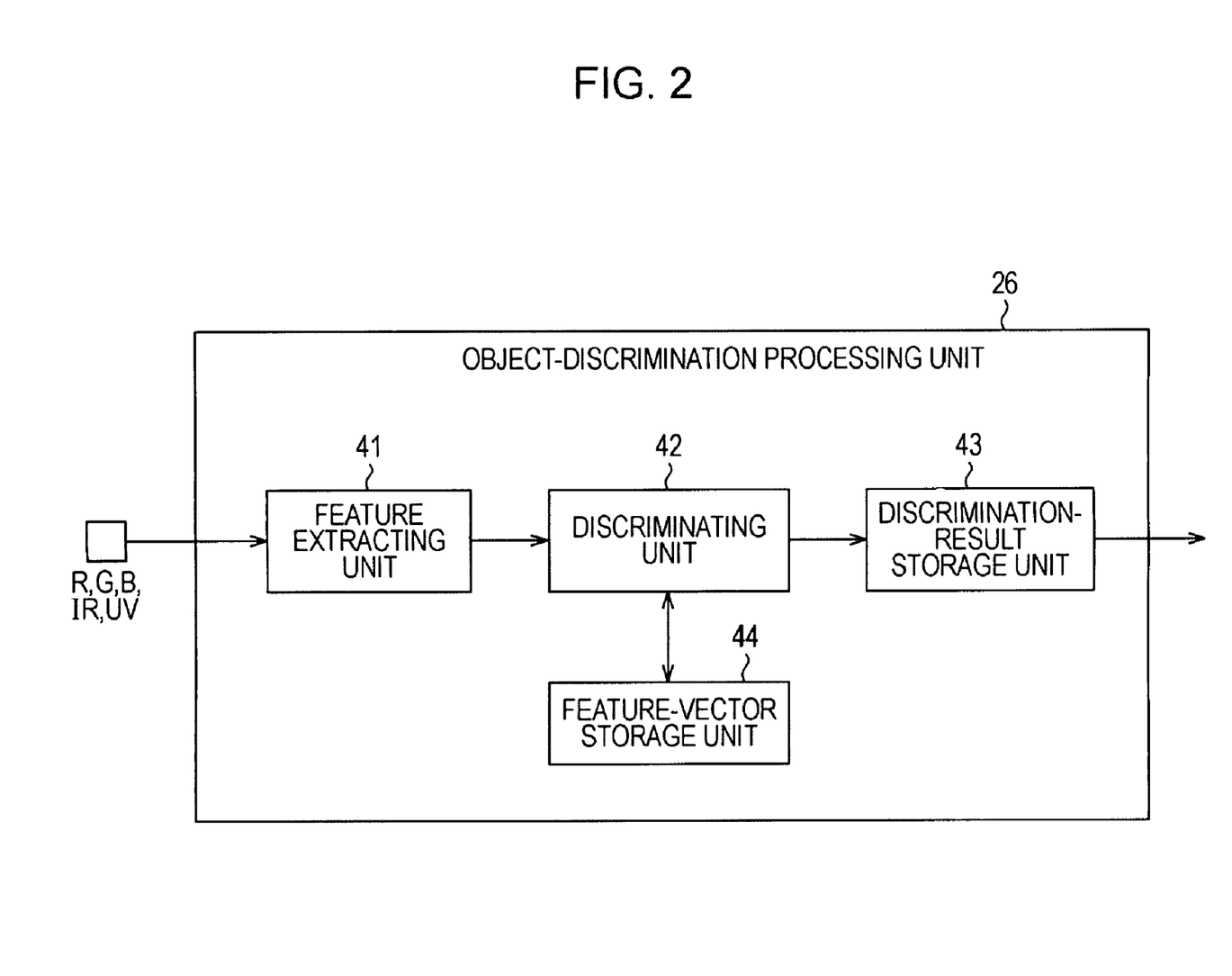
FIG. 2 is a diagram showing an example configuration of an object-discrimination processing unit.

The object-discrimination processing unit 26 shown in FIG. 7 differs from the object-discrimination processing unit 26 shown in FIG. 2 in that instead of the feature extracting unit 41 and the discriminating unit 42, a feature extracting unit 61, discriminating units 62-1 to 62-N for individual objects, and a selecting unit 63 are provided.

The feature extracting unit, 61 has substantially the same function as the feature extracting unit 41, and supplies extracted features to the discriminating units 62-1 to 62-N. The discriminating units 62-1 to 62-N are provided individually in association with N types of objects. For example, the discriminating unit 62-1 calculates a degree of similarity between an extracted feature and a feature vector representing blue sky as an object 1, the discriminating unit 62-2 calculates a degree of similarity between the extracted feature and a feature vector representing a tree leaf as an object 2, the discriminating unit 62-3 calculates a degree of similarity between the extracted feature and a feature vector representing human skin as an object 3, and so forth, and supplies these degrees of similarity to the selecting unit 63. The selecting unit 63 considers a feature vector having a highest degree of similarity as corresponding to an object represented by the subject pixel, and stores corresponding information in the discrimination-result storage unit 43.

Figure 8:
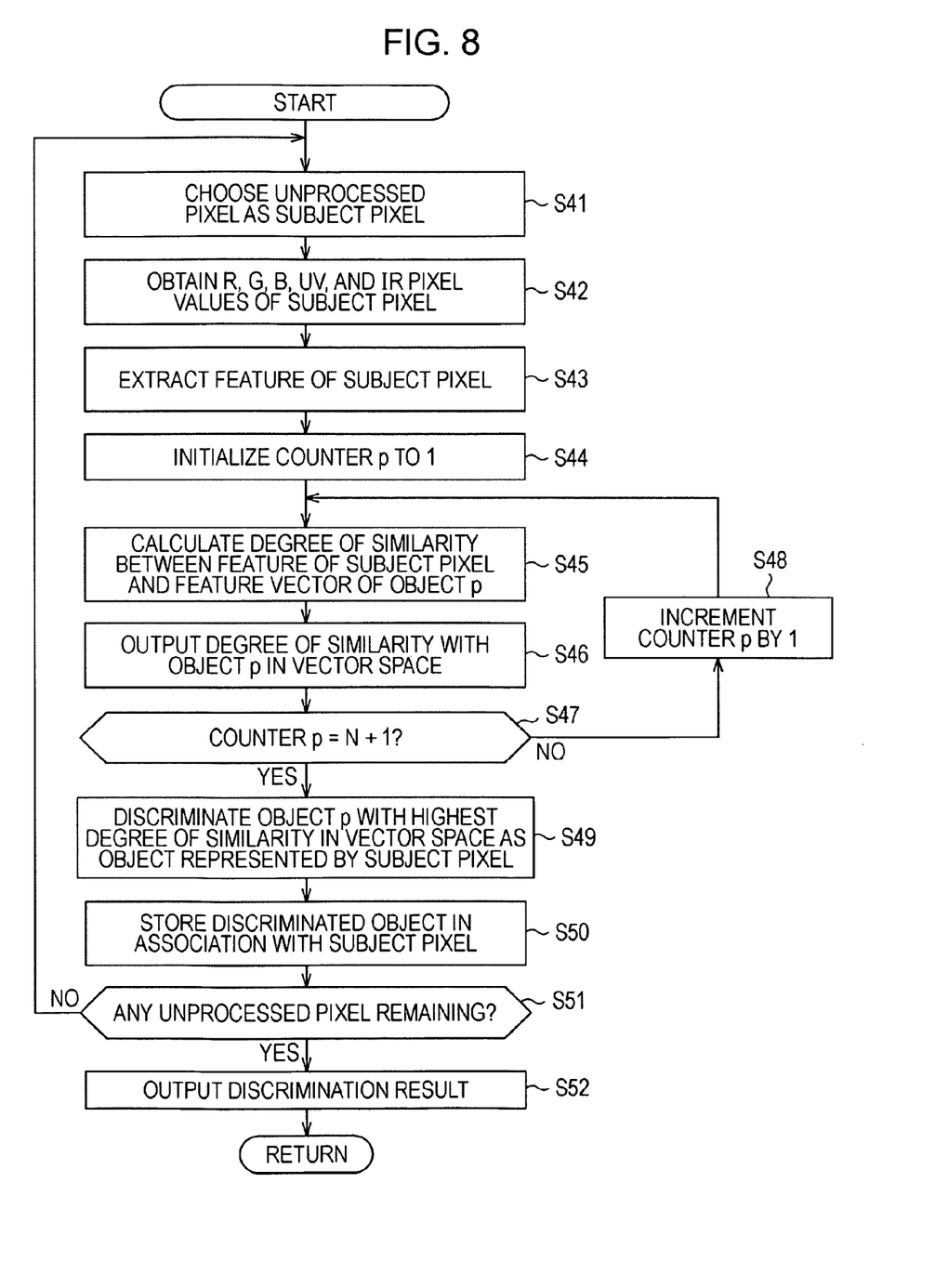
FIG. 8 is a flowchart of an object discrimination process executed by the object-discrimination processing unit shown in FIG. 7.

Next, the object discrimination process executed by the object-discrimination processing unit 26 shown in FIG. 7 will be described with reference to FIG. 8. Processing in steps S41 to S43 and steps S50 to S52 in the flowchart shown in FIG. 8 is the same as the processing in steps S21 to S23 and S26 to S28 described with reference to the flowchart shown in FIG. 4, so that description thereof will be omitted.

In step S43, for example, the feature extracting unit 61 extracts a feature vector FV expressed in equation (1) as a feature of a subject pixel, and supplies the feature vector FV to the discriminating units 62-1 to 62-N.

In step S44, a counter p (not shown) is initialized to 1.

In step S45, the discriminating unit 62-$p$ calculates, for example, a distance in a vector space as a degree of similarity between the feature vector supplied from the feature extracting unit 61 and a feature vector stored in the feature-vector storage unit 44 in association with the object p.

In step S46, the discriminating unit 62-$p$ supplies the degree of similarity between the extracted feature vector and the feature vectors registered in association with the object p to the selecting unit 63.

In step S47, it is determined whether the value of the counter p is N+1, i.e., whether all the discriminating units 62-1 to 62-$p$ have calculated degrees of similarity regarding the objects 1 to N. If it is determined that degrees of similarity have not been calculated for all the objects 1 to N, in step S48, the counter p is incremented by 1. Then, the process returns to step S45. On the other hand, if it is determined in step S47 that the value of the counter p is N+1, so that it is determined that all the discriminating units 62-1 to 62-N have calculated degrees of similarity for the objects 1 to N, the process proceeds to step S49.

In step S49, the selecting unit 63 selects an object with a highest degree of similarity with the feature vector of the subject pixel among the feature vectors for the objects 1 to N to discriminate the object represented by the subject pixel.

In the example described above, by repeating the processing in steps S45 to S48, the discriminating units 62-1 to 62-N sequentially calculate degree of similarity with the individually corresponding objects 1 to N, for convenience of description with reference to the flowchart. Actually, however, the discriminating units 62-1 to 62-N calculates degrees of similarity with the individual objects 1 to N by parallel processing. This serves to reduce processing time taken for discrimination of an object represented by a subject pixel.

In the example described above, the same feature is supplied to all the discriminating units 6271 to 62-N. Alternatively, for example, degrees of similarity with objects may be calculated by using different features optimal for calculating degrees of similarity for individual objects.

Figure 9:
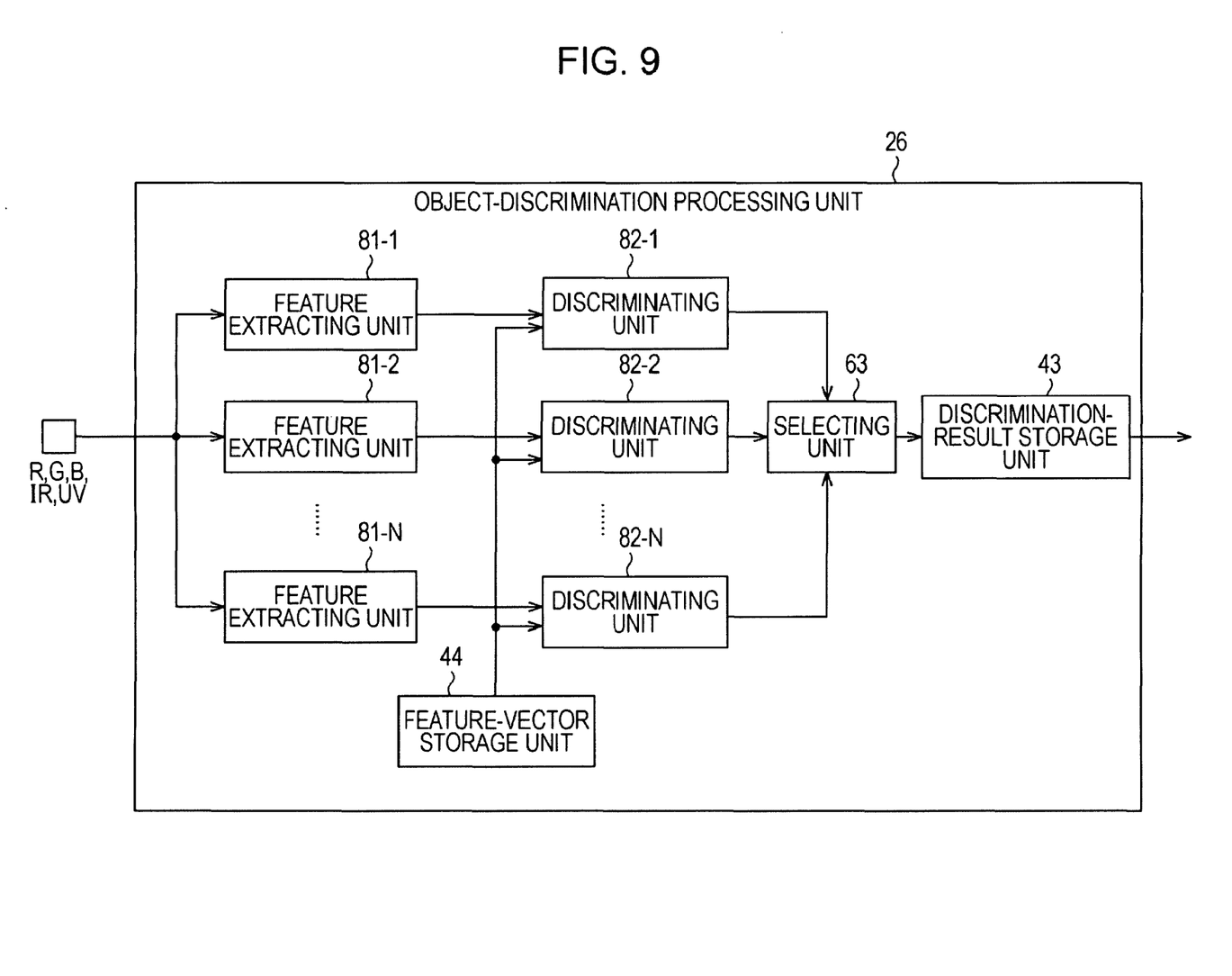
FIG. 9 is a diagram showing another example configuration of an object-discrimination processing unit.

FIG. 9 shows an example configuration of the object-discrimination processing unit 26 that calculates degrees of similarity with objects by using only features optimal for calculating degrees of similarity with the individual objects. Regarding the object-discrimination processing unit 26 shown in FIG. 9, parts corresponding to those of the object-discrimination processing unit 26 shown in FIG. 2 or FIG. 7 are designated by the same numerals, and description thereof will be omitted when appropriate.

More specifically, the object-discrimination processing unit 26 shown in FIG. 9 differs from the object-discrimination processing unit 26 shown in FIG. 2 or FIG. 7 in that instead of the feature extracting unit 41 and the discriminating unit 42, feature extracting units 81-1 to 81-N and discriminating units 82-1 to 82-N are provided for individual objects.

The feature extracting units 81-1 to 81-N extracts features optimal for calculating degrees of similarity from information of a subject pixel, and supplies the features individually to the discriminating units 82-1 to 82-N. For example, if the object 1 is human skin, information of IR, R, G, B, and UV components are converted into information in the HSV color space to generate a feature vector composed of information of HSV components, and the feature vector is supplied to the discriminating unit 82-1. The discriminating unit 82-1 calculates a degree of similarity on the basis of the feature vector composed of HSV components and an HSV feature sector obtained from information stored in advance in the feature-vector storage unit 44.

As another example, when the object 2 is a tree leaf, of information of IR, R, G, B, and UV components, a feature vector is generated from only partial information, and the feature vector is supplied to the discriminating unit 82-2. The discriminating unit 82-2 calculates a degree of similarity on the basis of the feature vector composed of partial information among IR, R, G, B, and UV components and a feature vector composed of the same type of information and stored in advance in the feature-vector storage unit 44.

As described above, the discriminating units 82-1 to 82-N are provided individually in association with N types of objects, and supplies degrees of similarity with the individual objects to the selecting unit 63.

Figure 10:
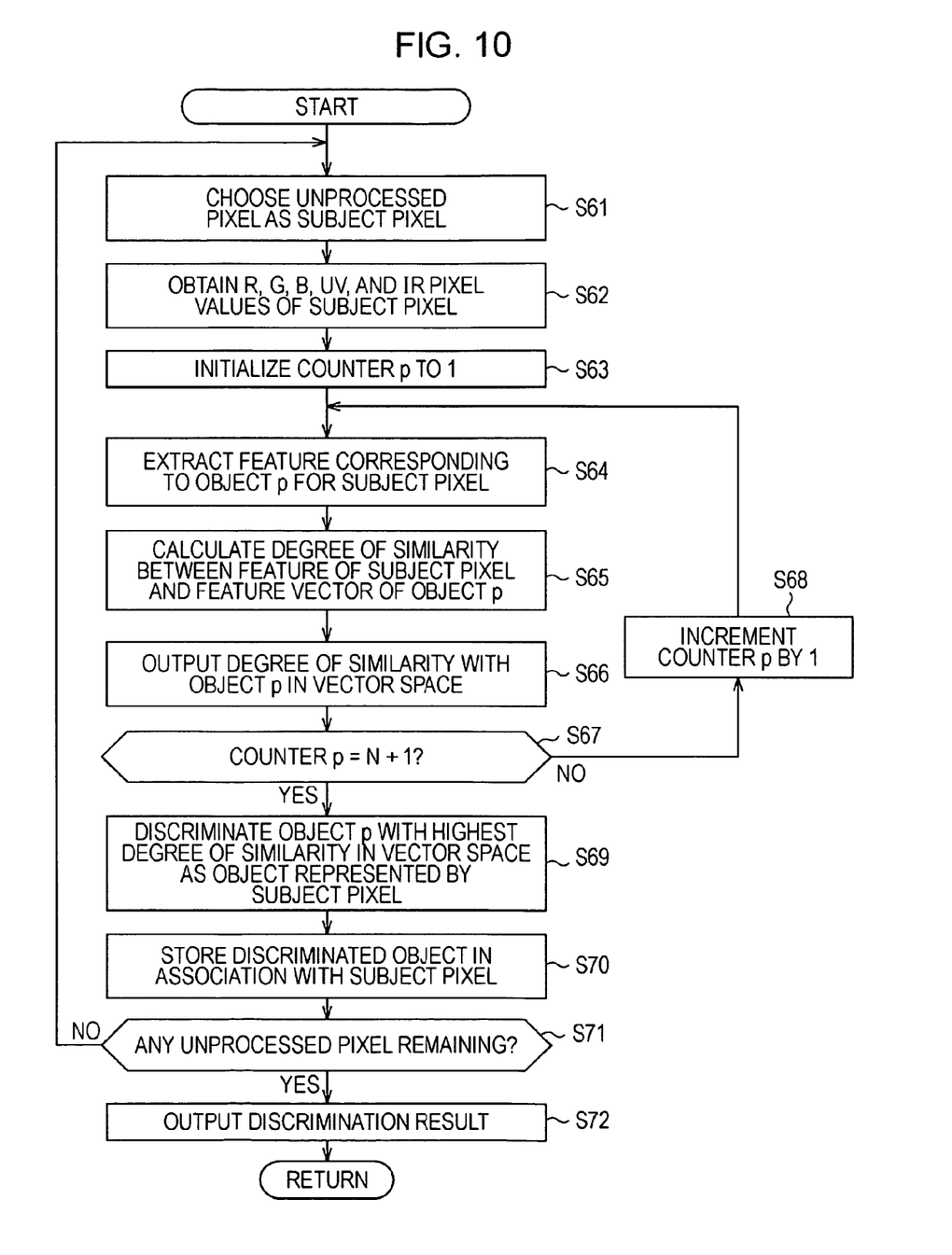
FIG. 10 is a flowchart of an object discrimination process executed by the object-discrimination processing unit shown in FIG. 9.

Next, an object discrimination process executed by the object-discrimination processing unit 26 shown in FIG. 9 will be described with reference to a flowchart shown in FIG. 10. Processing in steps S61 to S63 and S67 to S72 in the flowchart shown in FIG. 10 is the same as the processing in steps S41, S42, S44, and S47 to S52 described with reference to the flowchart shown in FIG. 8, so that description thereof will be omitted.

In step S63, a counter p (not shown) is initialized to 1.

In step S64, as a feature of a subject pixel, the feature extracting unit 81-$p$ extracts a feature vector composed of information optimal for discrimination of an object p, and supplies the feature vector to the discriminating unit 82-$p$.

In step S65, as a degree of similarity between the feature vector optimal for discrimination of the object p, supplied from the feature extracting unit 81-$p$, and a feature vector composed of the same type of information optimal for discrimination and stored in the feature-vector storage unit 44 in association with the object p, the discriminating unit 82-$p$ calculates, for example, a distance between these feature vectors in a vector space.

In the example described above, through repetition of processing in steps S64 to S68, the discriminating units 82-1 to 82-N sequentially calculate degrees of similarity with the individually associated objects 1 to N, for convenience of description with reference to the flowchart. Actually, however, the feature extracting units 81-1 to 81-N and the discriminating units 82-1 to 82-N calculate the degree of similarity with the individually associated objects 1 to N by parallel processing. As a result, processing time taken for discrimination of an object represented by a subject pixel can be reduced. Furthermore, since a degree of similarity is calculated on the basis of feature vectors suitable for characteristics of an object, it is possible to improve the accuracy of discrimination. Furthermore, since it is possible to omit unneeded information and to use only a parameter efficient for discrimination, it is possible to reduce the amount of data distributed and to improve the accuracy of discrimination.

According to what has been described above, by setting a feature vector involving non-visible radiation as well as visible radiation, it becomes possible to discriminate objects with high accuracy on a pixel-by-pixel basis. As a result, it becomes possible to discriminate objects not having any particular spatial features on a pixel-by-pixel basis in an image.

The series of information processing described above can be executed either by hardware or by software. In a case where the series of information processing is executed by software, programs constituting the software are installed from a recording medium onto a computer embedded in special hardware or a general-purpose personal computer or the like capable of executing various functions with various programs installed thereon.

Figure 11:
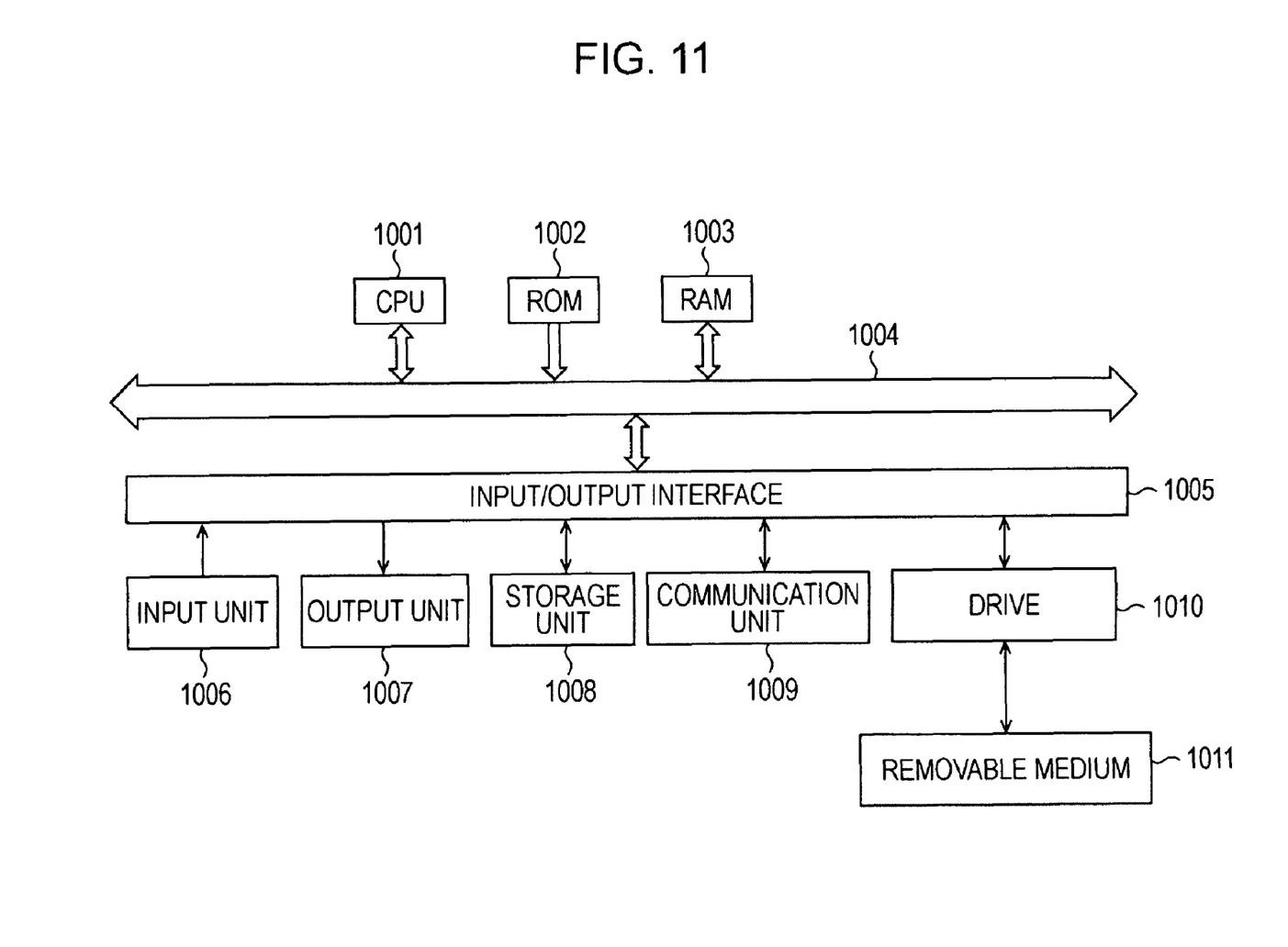
FIG. 11 is a diagram showing an example configuration of a personal computer.

FIG. 11 shows an example configuration of a general-purpose personal computer. The personal computer includes a central processing unit (CPU) 1001. The CPU 1001 is connected to an input/output interface 1005 via a bus 1004. The bus 1004 is connected to a read-only memory (ROM) 1002 and a random access memory (RAM) 1003.

The input/output interface 1005 is connected to an input unit 1006 having an input device with which a user can enter operation commands, such as a keyboard or a mouse, an output unit 1007 that outputs images of operation screens or processing results to a display device, a storage unit 1008 that stores programs and various types of data, implemented by a hard disk drive or the like, and a communication unit 1009 that performs communication via a network such as the Internet, implemented by a local area network (LAN) adaptor or the like. Furthermore, the input/output interface 1005 is connected to a drive 1010 that reads data from and writes data to a removable medium 1011, such as a magnetic disk (e.g., a flexible disk), an optical disc (e.g., a compact disc read-only memory (CD-ROM) or a digital versatile disc (DVD)), or a magneto-optical disc (e.g., a mini disc (MD)).

The CPU 1001 executes various processes according to programs stored in the ROM 1002, or programs read from the removable medium 1001, such as a magnetic disk, an optical disc, a magneto-optical disc, or a semiconductor memory and installed on the storage unit 1008 and loaded from the storage unit 1008 into the RAM 1003. The RAM 1003 stores data used during execution of various processes by the CPU 1001.

The steps defining the programs recorded on the recording medium may include, as well as processes executed sequentially in the orders described herein, processes that are executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   feature extracting means for extracting a feature in each local area from an image including a plurality of colors in bands of visible radiation and non-visible radiation, the feature having elements representing ratios between a reference color and individual colors; and
   discriminating means for discriminating an object in each local area by using the feature extracted for the local area by the feature extracting means.

2. The image processing apparatus according to claim 1, wherein the local area is an area defined on a pixel-by-pixel basis.

3. The image processing apparatus according to claim 1, wherein the non-visible radiation includes ultraviolet radiation and infrared radiation.

4. The image processing apparatus according to claim 1, wherein the reference color includes a color in a band of visible radiation.

5. The image processing apparatus according to claim 1, further comprising image pickup means for picking up an image including the plurality of colors in the bands of visible radiation and non-visible radiation.

6. The image processing apparatus according to claim 1, wherein the feature extracting means extracts, as the feature, a feature vector having the elements representing the ratios between the reference color and the individual colors for each local area.

7. The image processing apparatus according to claim 1, wherein the feature extracting means, in addition to extracting for each local area the feature having the elements representing the ratios between the reference color and the individual colors, extracts a spatial feature for each local area, and the discriminating means, in addition to discriminating the object in each local area by using the feature having the elements representing the ratios between the reference color and the individual colors, extracted for the local area by the feature extracting means, discriminates the object by using the spatial feature extracted for the local area by the feature extracting means.

8. An image processing method comprising the steps of:
   providing an image processor comprising a feature extracting unit and a discrimination unit;
   extracting a feature using the feature extracting unit in each local area from an image including a plurality of colors in bands of visible radiation and non-visible radiation, the feature having elements representing ratios between a reference color and individual colors; and discriminating an object using the discrimination unit in each local area by using the feature extracted for the local area in the feature extracting step.

9. A computer readable medium embodying a program for causing the computer to execute processing comprising the steps of:

extracting a feature in each local area from an image including a plurality of colors in bands of visible radiation and non-visible radiation, the feature having elements representing ratios between a reference color and individual colors; and discriminating an object in each local area by using the feature extracted for the local area in the feature extracting step.

10. An image processing apparatus comprising:

a feature extracting unit configured to extract a feature in each local area from an image including a plurality of colors in bands of visible radiation and non-visible radiation, the feature having elements representing ratios between a reference color and individual colors; and a discriminating unit configured to discriminate an object in each local area by using the feature extracted for the local area by the feature extracting unit.

\* \* \* \* \*